United States Patent [19]
Lerro

[11] 3,943,737
[45] Mar. 16, 1976

[54] MECHANISM USABLE WITH LOCKS AND TWO APPLICATIONS WHEREIN SAID MECHANISM IS USED

[76] Inventor: Luigi Lerro, Viale XXI Aorile 38B, Rome, Italy

[22] Filed: Mar. 28, 1975

[21] Appl. No.: 563,217

[52] U.S. Cl. ...................... 70/106; 70/186; 70/352; 70/360; 70/361; 70/411

[51] Int. Cl.$^{2}$E05B 63/14; E05B 29/08; B60R 25/02

[58] Field of Search ............ 70/102, 103, 104, 106, 70/186, 352, 360, 361, 411; 292/341.15

[56] References Cited

UNITED STATES PATENTS

| | | | |
|---|---|---|---|
| 18,169 | 9/1857 | Yale | 70/33 |
| 179,912 | 7/1876 | Guild | 70/352 |
| 853,926 | 5/1907 | Hope | 70/361 |
| 1,351,117 | 8/1920 | Newhall | 292/302 |
| 1,736,900 | 11/1929 | Carpenter | 70/185 |

*Primary Examiner*—Albert G. Craig, Jr.
*Attorney, Agent, or Firm*—Finnegan, Henderson, Farabow & Garrett

[57] ABSTRACT

A lock mechanism comprises a plug slidably to a home position into a cavity of a block which plug has a recess for receiving side-by-side plates.

Said block has a receptacle for receiving a similar set of spring biased plates. The front base of said plug a keyway with rectangular cross section communicates with said recess at a position close to the bottom thereof. A key is also provided for said mechanism which is made up of as many bars as are the plates.

The plates in said recess have a bevelled corner. The bevel plane of the plates and of the key bars being the same.

When the key is inserted home into said plug the bevelled point of each bar of the key engages the bevelled corner of a corresponding plate in the recess and lifts it to come flush with its upper edge with said recess aperture whereby the mechanism is unlocked.

When the key is withdrawn from said slot the plates in said receptacle are moved by the related springs to enter the plug recess and block the mechanism thereby.

Two locks and specifically a door lock and a steering lock are also described in which the mechanism of the invention is applied.

6 Claims, 16 Drawing Figures

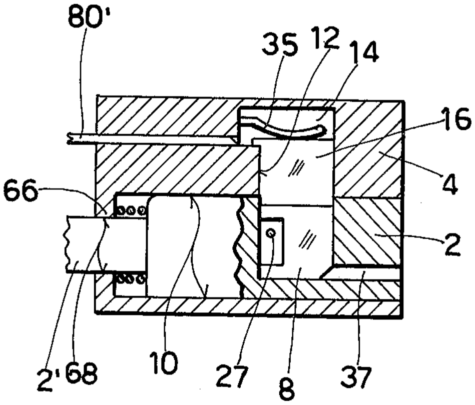
Fig. 4
Fig. 5
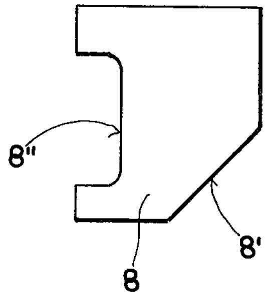
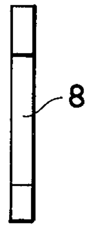
Fig. 6
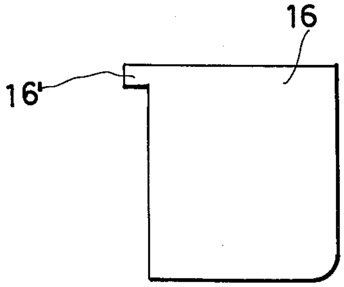
Fig. 7

MECHANISM USABLE WITH LOCKS AND TWO APPLICATIONS WHEREIN SAID MECHANISM IS USED

The object of this invention is a mechanism for a lock with modifiable key and some applications thereof.

A number of lock mechanisms are known wherein the mechanism by which a lock bolt or similar fastening means is operated comprises two members of which one — named plug — is slidable within the other when a proper key is introduced into the plug, while it is prevented from sliding when the key is withdrawn therefromn because a set of pins extend into the plug from the inside of the other member thereby locking the two members to one another. By inserting the key said pins are displaced out of the plug whereby this is set free to slide with respect to the other member. Yale locks belong to this class. Such locks provide a security which is the higher the greater is the number of pins to be displaced by the key. However any increase of the number of pins involves a larger size of the lock and of the key. Furthermore such locks of the prior art do not permit a high manufacturing precision so that a key for them is readily counterfeited.

In addition, as a common practice, in manufacturing such locks a number of series of locks are produced which are identical to one the others and there is no means for modifying the individuality of a manufactured lock.

It is therefore the main object of this invention to provide a lock mechanism which overcomes the above drawbacks. In fact, the mechanism of this invention is very compact, it can be manufactured with the utmost precision and at relatively low cost; it provides a number of secret combinations greater than with the mechanisms of the same size presently available and, last but not least, it can be readily modified by interchanging the functional elements of the mechanism and of the key.

The mechanism of this invention substantially comprises two prismatic members with parallel axes one of which is slidable within the other along said axes. The inner prism or plug is provided with a prismatic recess extending from the side surface of the plug, in which recess a set of small rectangular plates are received in a side by side relation parallel to the prism axis. The plates are all identical, excepted their height which is the dimension parallel to the recess axis, all the plates having one of the lower corners identically bevelled.

Said recess communicates with the side surface of said plug through a window and with the front base of the plug through a slot which functions as a keyway which slot opens into the recess at the same level as said bevelled corners of the plates.

A housing is provided within the outer prismatic member which communicates with the inner surface thereof through a window having the same dimensions as said window of the plug. A set of small plates is received in said housing which plates are as many as the plates in said recess, have the same thickness, each plate in the housing being coplanar with a corresponding plate in said recess and being biased by a spring towards the recess. The key to operate the above mechanism comprises a set of small bars or needles with bevelled ends adapted for mating with said bevelled corners of each plate in said recess. The key needles are removably fitted in side by side relation in a fixture which functions as a handle.

When the key is fitted home into the keyway the plates in said recess are flush with the interface between said outer and inner prismatic member of the mechanism whereby these can move with respect to one another.

When the key is withdrawn from the keyway the plates in said recess are moved towards the recess bottom by the corresponding plates in said housing which are each urged by a spring to move towards the inner member.

Thus a portion of each plate from said housing enters said recess through both the windows of the outer and inner member and lock them together thereby.

The invention will be readily understood from the following description and from the attached drawings which illustrate some preferred embodiments thereof given by way of example.

In the drawings:

FIG. 4 shows a diagrammatic longitudinal cross section of the locking mechanism of the invention in a simplified variant thereof;

FIG. 5 shows a side view of one of the plates within the inner member of the mechanism of the invention FIG. 6 shows a front view of the plate of FIG. 5;

FIG. 7 shows a side view of one of the set of plates within the outer member of the mechanism of the invention;

Figure 1:
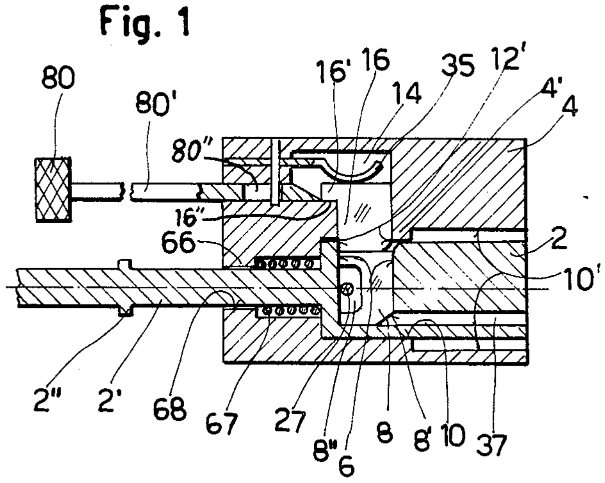
FIG. 1 shows a diagrammatic longitudinal cross section of the locking mechanism of this invention in locked condition.
Figure 2:
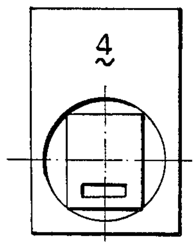
FIG. 2 is a diagrammatic longitudinal cross section of the locking mechanism of the invention in unlocked condition.
Figure 3:
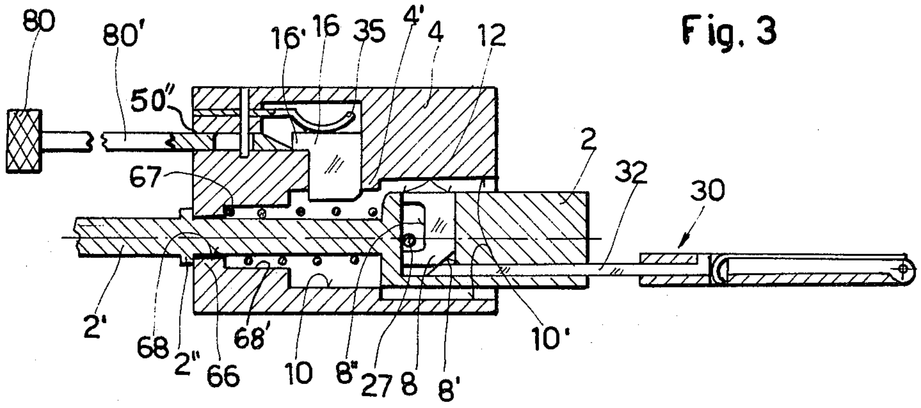
FIG. 3 shows a front view of the locking mechanism of FIGS. 1 and 2.

With reference to FIG. 1, the locking mechanism of this invention comprises substantially two prismatic rectangular members; a first member named plug 2 being slidably received in a cavity of a second member named body 4. As the length of said members the dimension will be meant which in FIG. 1 is horizontal while the height is the vertical dimension in FIG. 1 and the width is the dimension in FIG. 1 perpendicular to the drawing sheet.

Plug 2 is provided with a prismatic recess 6 of which the axis is perpendicular to the plug longitudinal axis and the cross section perpendicular to said axis of the recess is rectangular; which recess extends from one of the side faces of the plug to nearly reach the opposite face of the plug. Within said recess a set of plates 8 is received which plates are all identical save for their height which is different. The difference between the highest plate and the shortest one is equally shared between the plates. When for instance the highest plate is 14 mm and the shortest one is 9.5 mm and 10 plates are involved, then the height difference between a plate and the next one in order of height is 0.5 mm. In fact $$9.5 + (0.5 \times 9) = 14$$

The shape of the plates as shown in FIGS. 5 and 6 is rectangular with a corner 8' bevelled of the two adjacent to the bottom of recess 6 when the plate is fitted thereinto. One of the two edges of plate 8 parallel to the recess axis is provided with a notch 8'' and a pin 27 is fitted through body 4 crosswise of plates 8 within the space defined by said notch to prevent the plates from escaping from recess 6 while allowing them a certain amount of freedom in the direction of the recess axis. Pin 27 can be replaced by a leaf restrained into the plug and extending into the notch as indicated by reference number 27' in FIGS. 11 and 12.

Plug 2 is provided with a longitudinal slot 37 which is the keyway of the mechanism and extends from the front base of the plug to communicate with recess 6 flush with the bottom thereof.

The second member or body 4 of the mechanism is a prism of which the height — that is its vertical dimension as seen in FIGS. 1 to 4 of the drawings — is about twice the height of plug 2. In the lower portion of body 4 a longitudinal through channel is provided which for a first section 68 is cylindrical, for a second section 68' is still cylindrical but with larger diameter than the first section, for a third section 10 is prismatic with cross section slightly larger than the cross section of plug 2 and for a fourth section 10' is again cylindrical.

Plug 2 is slidably received in said longitudinal channel along with a cylindrical extension 2' thereof which fits through said first section 68 of the channel and the purpose of which is for actuating the bolt works of a lock, for instance a door lock. Around extension 2' a spring 67 is wound which when fully compressed occupies the space between the wall of said second section 68' of said channel and said extension. In the third prismatic section 10 of the channel, a portion of plug 2 is received including said recess 6. When plug 2 is fully inserted into the third portion 10 of said channel, window 12 of recess 6 registers with the corresponding window 12' which gives access to a receptacle 14 wherein a second set of plates 16 is received which consists of as many plates as in the recess 6 of plug 2. Plates 16 are all identical and have the same thickness and width as said plates 8 in said recess. They are arranged side by side so that each plate 16 rests with its lower edge on the upper edge of a corresponding plate 8. Each plate 16 is provided with a side lug 16' having the same thickness of the plate. The whole set of plates 16 is slidable along a prismatic portion of receptacle 14 each plate being biassed towards plug 2 by a corresponding tine of a multiple leaf spring 35. However they are prevented from being expelled from the receptacle by a shoulder 16'' intended for engaging lugs 16'.

When plug 2 is fitted into the body 4 of the mechanism, each plate 16 penetrates the recess 6 for an amount which depends on the height of the corresponding plate 8. Thus plug 2 is prevented from sliding with respect to body 4.

Figure 8:
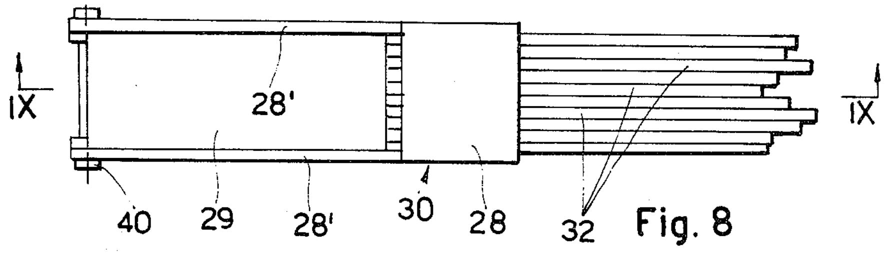
FIG. 8 shows a top plan view of the key for actuating the mechanism of the invention.
Figure 9:
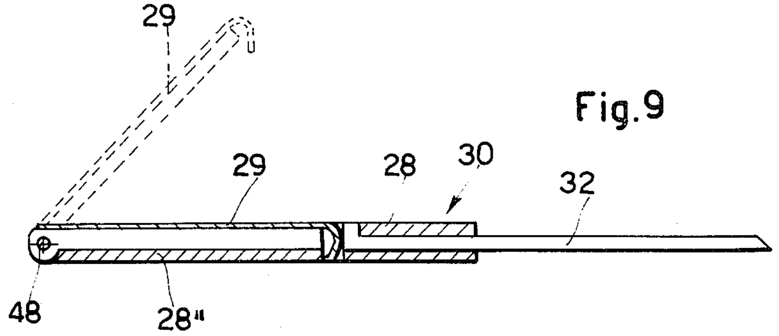
FIG. 9 is a cross section of the key of FIG. 8 taken along line IX—IX thereof.

The mechanism of this invention includes a key 30 of novel design which is illustrated by FIGS. 8 and 9 of the drawings. Key 30 comprises a set of as many small bars 32 as are the plates 8 in recess 6 of plug 2 and plates 16 in receptacle 14. Said bars have pointed ends being bevelled at the same angle as the lower corners of plate 8 adjacent to the inner end of slot 37.

By fully inserting the key into slot 37 of plug 2, the plates 8 are raised to come flush with their upper edges with the window 12 of recess 6. Supposing that the bevel angle of the key bars and of the lower corners 8' of plates 8 is 45°, the length difference between the longest and the shortest bar is the same as the difference between the highest and the shortest of plates 8.

The cross section is the same for all the bars 32, their thickness being the same as plates 8. Bars 32 are assembled in a fixture which permits to readily interchange them. A preferred form of fixture will be now described as an example.

It comprises a flat rectangular ring 28 into which the bars 32 are slidably fitted. Each bar is provided with a lug which engages the ring thus preventing the bar from sliding out of the ring in the direction of the bar point.

One of the longer sides of ring 28 extends for a length 28 inches in the direction opposite to the bars for supporting at its end a hinge 48 for a plate 29 having substantially the same length as said extension 28''. At its free end plate 29 has a bent edge. When plate 29 is rotated to lie flat against extension 28'', its curved edge abuts against the ends of bars 32 and fits into a transverse slit of which extension 28'' is provided. In this way the key bars 32 are prevented from coming out of ring 28 and their lugged ends are kept aligned therein.

The operation of the mechanism is as follows.

To lock the mechanism the plug 2 is driven into section 10 of the channel in body 4 until window 12 of recess 6 register with window 12' of receptacle 14. In this position, plates 16, urged by spring 35, penetrate the plug recess 6 for an amount which depends on the height of the corresponding plate 8 in said recess. Thus plug 2 is prevented from sliding with respect to the mechanism body 4.

To unlock the mechanism, key 30 is completely inserted in slot 37. Thus plates 8 are all raised to reach with their upper edges the interface between plug 2 and body 4 and plug 2 is set free for longitudinal movement, spring 67 forces plug 2 out of body 4 towards the key operator until a collar 2'' stops such movement. At this point the whole of plug 2 is out of section 10 of the through channel and because the diameter of the fourth section 10' of the through channel is large enough for it, plug 2 can be rotated for actuating the bolt works of a lock, for instance a door lock. During such rotation plates 8 are prevented from projecting from recess 6 by pin 27 or by metal leaf 27' and plates 16 are prevented from projecting too much from receptacle 14 by the limiting shoulder 16'' with which the plate lugs 16' are engaged. However shoulder 16'' should permit all plates 16 to project from window 12' for a certain amount.

A further means is provided for unlocking the mechanism from the other side thereof that is from the side opposite to the keyway.

This comprises a bar 80' with rectangular cross section slidably inserted in a slot 50'' which communicates receptacle 14 of body 4 with the rear base thereof. Bar 80' has a wedged end of which the edge is at the same level as the lower side of said slot. The purpose of bar 80' is for lifting plates 16 to such a level that their lower edges come flush with said window 12' of receptacle 14. This is achieved by forcing bar 80' between lungs 16' of plates 16 and said shoulder 16'' of body 4. Bar 80' is provided with a slit 80'' through which a pin is mounted for limiting the bar travel and with a knob 80 for actuating it. Thus a locking mechanism has been described which when unlocked can actuate by means of rod 2' the works of a lock bolt or the like either by the longitudinal movement of said rod or by its rotational movement or by both. However in some instances, as will be shown hereinafter, no rotational movement of rod 2' is required for actuating said works. Therefore a variant to the mechanism as above described has been envisaged for use in such cases when a longitudinal movement only of rod 2' is required. Such variant is illustrated by FIG. 4 and its differences from the previously described mechanism simply consist in the fact that there is no cylindrical cavity 10' and rod 2' may have a cross section other than circular. Thus, according to this variant, said through channel of body 4 comprises only a prismatic cavity 10 and a hole 68 through wall 66 of body 4.

Figure 11:
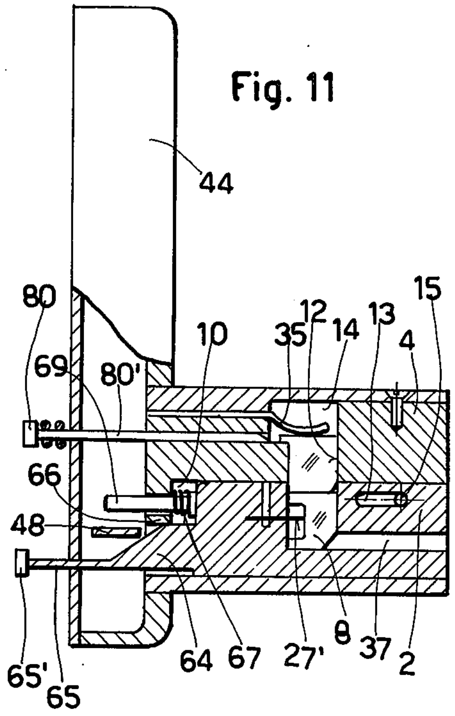
FIG. 11 shows a side view of the door lock of FIG. 10 partly sectioned along line XI—XI thereof.
Figure 12:
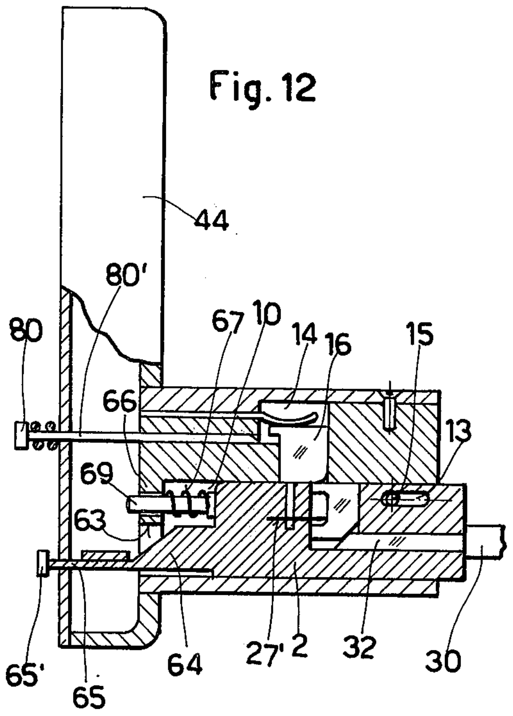
FIG. 12 shows a side view of the door lock of FIG. 10 partly sectioned along line XII—XII thereof
Figure 13:
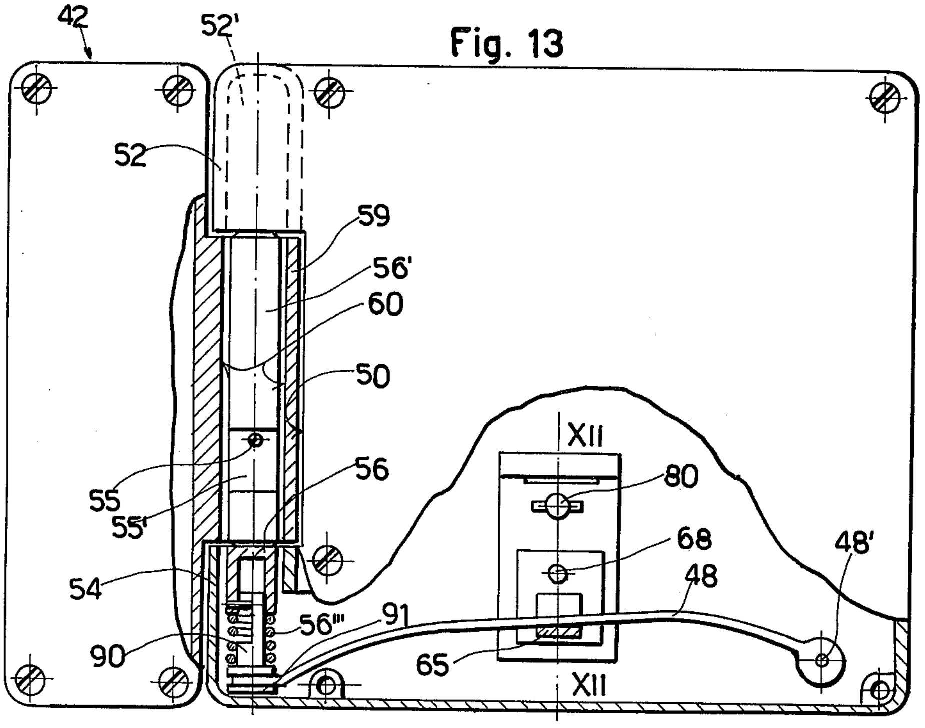
FIG. 13 shows a front view of the door lock of FIG. 10 in its unlocked condition.

Further, according to this variant, the means for limiting the travel of plug 2 may comprise a slot 13 in the plug and a pin 15 carried on body 4 of the mechanism as shown in FIGS. 11 and 12 of the drawings.

Two locks will be now described to which the mechanism of this invention is applied.

Figure 10:
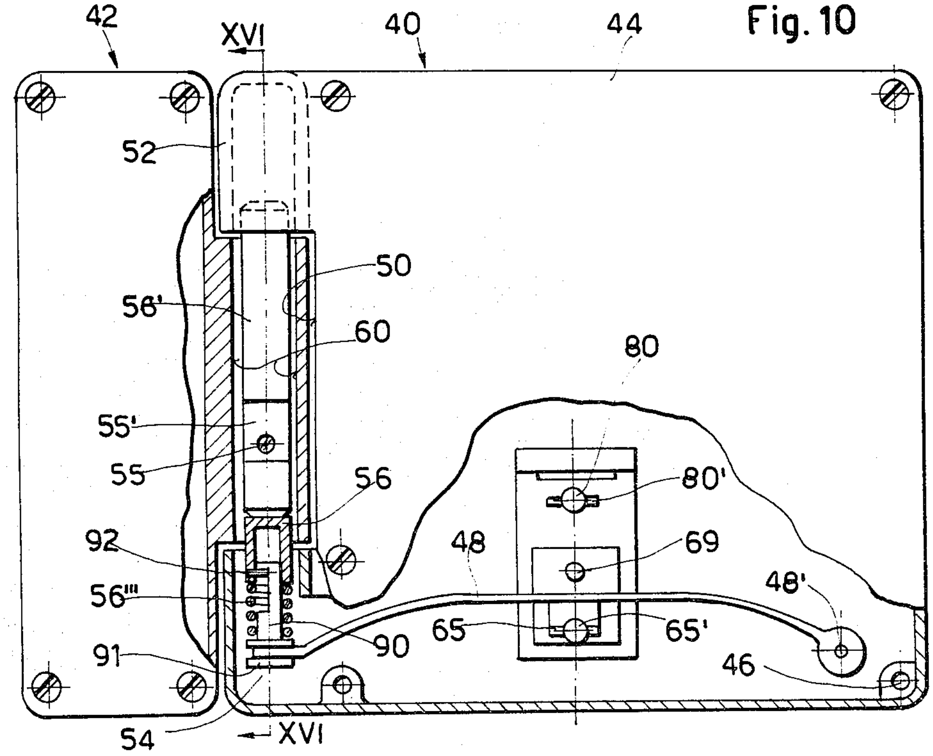
FIG. 10 is an elevation front view partly broken away of a door rim lock in which the locking mechanism of the invention is utilized, the lock being shown in locked position.

The first one is a door lock and is illustrated by FIGS. 10 to 13. The lock comprises two main components a first component 40 to be attached to one of the door wings and which includes the bolt works and the mechanism for actuating them and a second component 42 to be attached to the other wing of the door. Component 40 comprises a rather shallow rectangular casing 44. When referring to its height, length and width, the dimensions will be meant which in FIG. 10 are vertical, horizontal and transverse to the sheet respectively.

Casing 44 has reinforced corners for attaching it to the door wing by any means such as by screws. The casing side opposite to the door is removable. The casing side facing the second door wing has a rectangular notch 50 at substantially the middle part thereof. Notch 50 is defined by an upper 52 and a lower 54 extensions of casing 44 which have reciprocally facing apertures.

Component 42 is also a casing having the same height and thickness of component 42 and is provided with a projection 59 which, when the door is shut, fits into notch 50 of the first component 40. Projection 59 is provided with a vertical through channel 60 in which a bolt 56' is slidably received, the length of bolt 56' being the same as channel 60, the travel of bolt 56' being limited by a pin 55 which fits into a notch 55', the downward travel of the bolt being such that its lower point cannot surpass the lower end of channel 60.

From said aperture of extension 54 a latch 56 projects upwardly when the door is locked while its comes flush with the aperture when the door is unlocked.

Within casing 44 a flat lever 48 is housed of which the width is the same as the depth of said casing, which lever is pivotally mounted on a pin 48' at one of the casing lower corners and has a forked end which fits into a peripheral groove at the lower end of latch 56. Specifically latch 56 comprises two main components, that is the latch proper 56 and a pin 90 slidably received in a cylindrical cavity of latch 56. A helical spring 56''' fitted between the lower edge of latch 56 urges the latter to move upwards that is towards channel 60 of projection 59. However the travel of latch 56 is limited by a pin 92 which fits into a notch of pin 90. The notch length is such that when lever 48 is at its lowermost position and spring 56''' is extended its full length the point of latch 56 is flush with the aperture of extension 54, while when lever 48 is raised at its highest position, and spring 56''' is fully extended, latch 56 penetrates channel 60.

However, when the latch is in this position and spring 56''' is fully depressed, the latch point comes again flush with said aperture.

Figure 16:
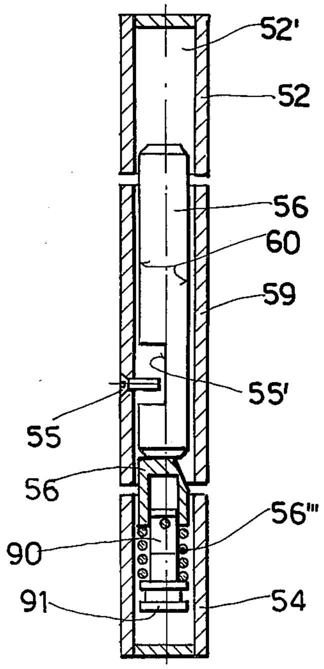
FIG. 16 shows a cross section of the door lock of FIG. 10 taken along line XVI—XVI thereof.

The point of latch 56 is bevelled, the bevel 55 (FIG. 16) plane intersection with the door plane being along a horizontal line. Thus latch 56 functions as a conventional spring latch. On that side of casing 44 which lies against the door a locking mechanism is mounted according to the above variant of the mechanism of this invention illustrated in FIG. 4. As shown by FIGS. 11 and 12 said mechanism is firmly attached to that side of component 44 which lies against the door wing and extends through the wing for the whole thickness thereof.

Plug 2 of the mechanism is provided with two members which have not been described up to now. A first member comprises an extension 64 of plug 2 which is provided with a cam surface which slopes downwards towards the inside of casing 44 and terminates with a flat tongue 65 provided with a knob 65'. An aperture 63 is provided through wall 66 of body 4 for permitting the travel of the sloping portion of extension 64 into and out of casing 44 and another aperture is provided through the wall of casing 44 in front of body 4 for tongue 65. By pulling knob 65' the mechanism can be locked from the inside of the door.

The second member is a stud 69 which is fastened to the rear base of plug 2 and extends through a hole of the rear wall 66 of body 4. A helical spring is wound around stud 69 between the rear face of plug 2 and wall 66 for ejecting plug 2 when unlocked.

As shown by FIG. 11, when plug 2 is fully inserted into cavity 10 of body 4, extension 64 of plug 2 slips under lever 48 and this lifts latch 56 and bolt 56'. Thus latch 56 enters channel 60 and bolt 56' enters extension 52 of casing 44 and the door is locked thereby. By inserting the key into plug 2, this is unlocked with respect to body 4 and is moved rearwards by spring 67.

The sloping portion of extension 64 is thus wothdrawn from under lever 48 and this drops downwards along with latch 56 and bolt 56'. The door is thus unlocked.

In order to unlock the door from the inside without using the key, knob 80 is pushed which through blade 50' lifts plates 16.

Figure 14:
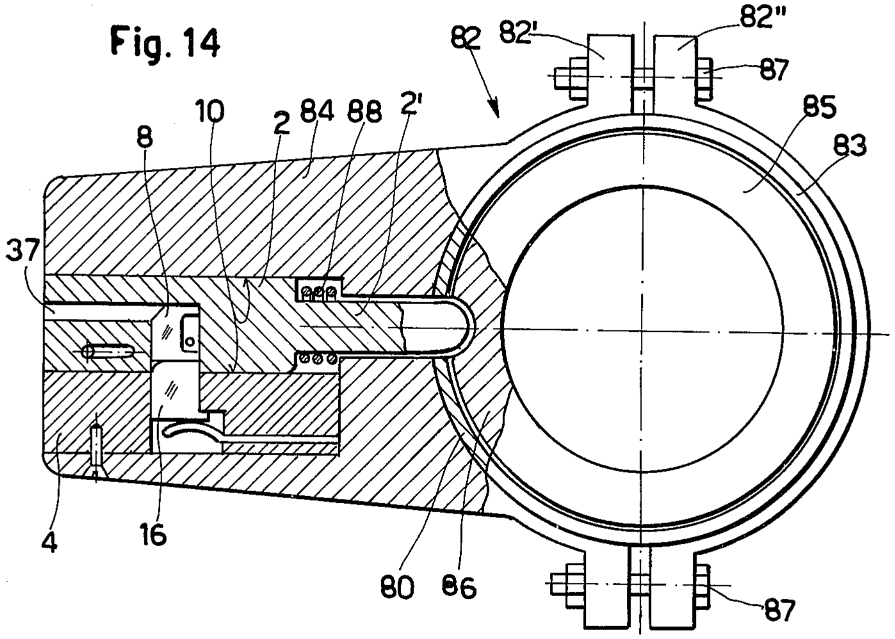
FIG. 14 shows a lock for locking the steering column of a motor vehicle in which lock the mechanism of the invention is applied.
Figure 15:
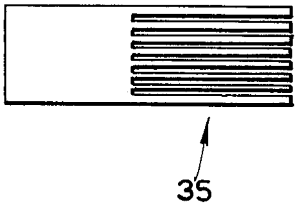
FIG. 15 shows a top view of a multiple spring for biasing the plates within the outer member of the mechanism of the invention.

In FIG. 14 a steering lock is illustrated wherein the mechanism of this invention is applied.

As shown by FIG. 14 lock 82 comprises a collar 82 made up of two halves 82' and 82'' which embrace the jacket 83 of a steering column 85 as of a car. Parts 82' and 82'' are fastened together by no-tamper bolts 87. One of the two parts of the collar, for instance part 82' has a flat block 84 attached thereto in which a housing is provided for the mechanism of this invention.

Extension 2' of plug 2 in this case is in the form of a latch with rounded point which, when plug 2 is fully inserted into cavity 10 of body 4, enters a hole through jacket 83 and into column 85. When, by inserting the key, plug 2 is unlocked from body 4, plug 2 is urged by sprig 88 out of cavity 10, whereby said point of extension 2' is withdrawn from the column 85 and jacket 83 which are thus free to rotate one with respect to the other.

What I claim is:

1. A locking mechanism which comprises two prismatic members with parallel longitudinal axes and front and rear bases perpendicular thereto, one of which members, named plug, being slidably received into a longitudinal cavity of the other member named body, which plug has a transverse recess extending from one of the plug side faces to nearly reach an opposite face thereof and a longitudinal channel extending from the front face of the plug to communicate with said recess at a position adjacent to the bottom thereof, said cavity having a hole at one end thereof with a cross section smaller then the plug, an extension of the plug being slidably fitted through said hole and a spring being wound around said extension between the rear end of the plug and a shoulder of said body around said hole; a receptacle extending transversely from the inner surface of said cavity into said body, said recess and said receptacle having apertures of identical size and shape on reciprocally engaging surfaces of said plug and of said body, two sets of plates in identical number in side-by-side relation parallel to the plug longitudinal axis being received one set into said recess and the other into said receptacle, the plates of the two sets being individually slidable in a direction transverse to said plug and having all the same cross section in a plane perpendicular to said direction, the plates in said recess having different dimensions in said direction, each of them having the corner adjacent to said channel bevelled along a plane perpendicular to the plate plane, the plates in said receptacle having all the same dimensions and being each provided with a lug adapted for engaging a shoulder of said body within said receptacle and being each urged by a spring to move towards said plug; a key made up of as many bars as are the plates of one of said sets which bars have all the same height and thickness, this being the same as said plates, but different lengths, one end of each bar being bevelled along the same plane as said corners of the plates in said recess; said bars being removably assembled together in side-by-side relation to form a bundle adapted to fit into said channel of said plug; the lengths of said bars being such that when the key is fully inserted into said channel the upper edges of the plates in said recess are brought to the level of the interface between said body and said plug.

2. A locking mechanism as per claim 1, wherein said hole and said plug extension slidably received therethrough are both cylindrical, which mechanism is further provided with a cylindrical cavity coaxial with said extension and extending from the front face of said body to nearly reach the aperture of said receptacle, the radius of said cylindrical cavity being larger than the maximum radial dimension of said plug as measured from the axis of its extension whereby said plug can be rotated one whole revolution after withdrawing it from said prismatic cavity.

3. A locking mechanism as per claim 1, which is further provided with a flat bar with a wedgelike end which bar is slidably received in a slot which communicates said receptacle with the rear face of said block, the edge of said wedgelike end being located at the level of said shoulder within said receptacle on which plate lugs come to rest when said plug is withdrawn from said prismatic cavity whereby said plates in the receptacle are lifted when said flat bar is forced towards said receptacle and its wedgelike end is inserted between said lugs and shoulder.

4. A mechanism as per claim 1 wherein said key comprises a set of bars and a flat rectangular ring into which the whole set of bars it slidably fitted, each bar being provided at its end opposite to the bevelled one with a transverse side lug adapted for engaging the ring edge; one of the larger sides of said ring extending in the direction opposite to the bevelled edge of said bars for supporting at its end a hinge for a plate which is provided at its end opposite to said hinge with a bent border adapted for engaging the lugged ends of said bars and preventing them from moving away from the ring when said plate is rotated about said hinge to lie flat against said extension of the ring, each bar of the key being marked with the same mark of the corresponding plate in said recess.

5. A door lock of the type called rim lock, which lock comprises a first and a second components in the form of shallow casings to be fastened each onto a wing of the door, the first component being provided with an upper and a lower portions extending towards the second component and defining a notch at the middle of its side facing the other component into which notch a corresponding portion of the other component is received when the door is shut; the upper and lower extensions of the first component being provided with apertures confronting each other, the extension of said second component being provided with a through channel of which the ends register with said apertures when the door is shut, in which channel a bolt is slidably received for limited travel, which bolt has the same length as the channel; a lever pivotally mounted within said first component at one of the lower corners thereof, which lever terminates with a forked end which engages the lower end of a spring latch slidably fitted into the aperture of said lower extension of the casing; a locking mechanism as claimed in claim 3, which mechanism is attached to the side of said first component adjacent to the door wing, the axis of the mechanism plug being perpendicular to the door plane; said extension of the mechanism plug being provided with a cam surface sloping downwards towards the said first component and having a further extension of which the end projects from the side of said casing opposite to the door; said cam surface being in engagement with said lever for rotating it between a locked and an unlocked portion.

6. A steering lock for automobiles, which lock comprises a bracket to be fastened by means of a split collar to the jacket of a steering column of a motor vehicle, a housing within said bracket in which a locking mechanism as claimed in claim 3 is received, the plug extension being in the form of a bolt which penetrates through said jacket and into said column when said plug is at its innermost position within said body cavity whereby said column is prevented from rotating with respect to its jacket when said plug is in said home position.

* * * * *